Bernard L. Schulman
Walter G. May  Inventors

By *George J. Sichary* Attorney

May 12, 1959  B. L. SCHULMAN ET AL  2,886,518
RECOVERING DUST FROM GASEOUS STREAMS
Filed July 17, 1956  3 Sheets-Sheet 2

Bernard L. Schulman  Inventors
Walter G. May

By *George J. Sichary* Attorney

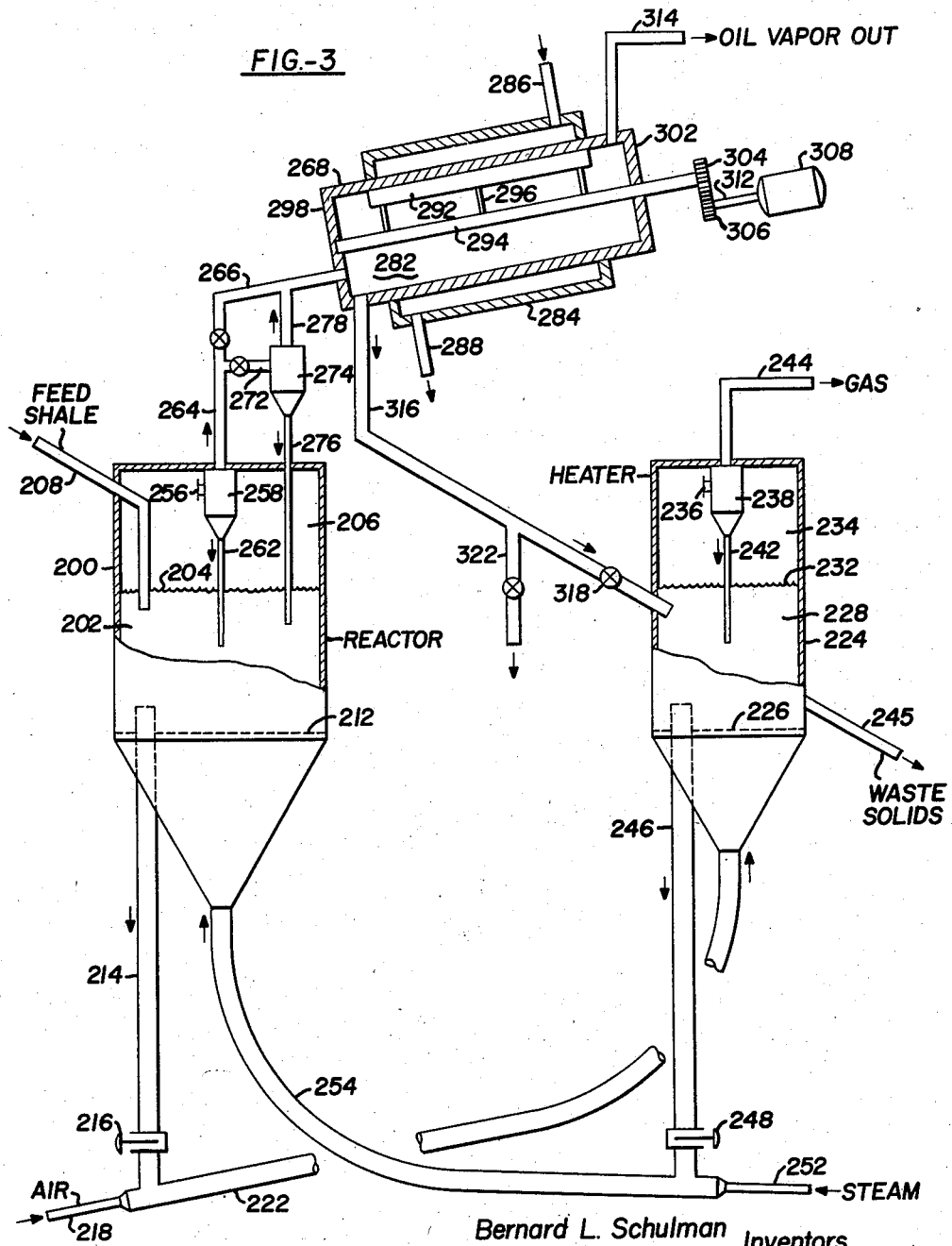

2,886,518
RECOVERING DUST FROM GASEOUS STREAMS

Bernard L. Schulman, Edgewood, Md., and Walter G. May, Union, N.J., assignors to Esso Research and Engineering Company, a corporation of Delaware Application July 17, 1956, Serial No. 598,287

3 Claims. (Cl. 208—161)

This invention relates to removal and/or recovery of dust or extremely finely divided material from gaseous materials.

Some processes such as fluid platinum hydroforming yield gaseous materials containing fine dusts of valuable material such as platinum. This loss will occur during regeneration in a regenerative process with the flue gases containing minute amounts of platinum-containing dusts not removable by the ordinary dust separating means. In another fluid process such as fluid calcining of uranium nitrate, fine dusts of dangerous materials are released and the fine dusts will not be removed with conventional dust separating means. There are other processes which yield streams containing dust which are not valuable enough to recover and which are not health endangering but which nevertheless are a nuisance in that they cause air pollution.

According to the present invention extremely fine particles or dust particles, especially those below a size of about 10 microns, preferably below about 5 microns, are separated from gaseous materials and recovered. The smaller the particles in this range below about 10 microns the easier and more complete the removal of the fine particles or dust.

According to one form of the present invention extremely fine solid particles or dust is removed from gaseous streams and collected by passing such gaseous streams at a relatively low velocity through one or more cooling tubes to cause the finely divided solids to deposit on the wall of the cooling tube or tubes and agglomerate to form a hard deposit. It is essential to have high temperature differences between the gaseous product and the cooling surface. This hard deposit is removed in any suitable manner, such as scraping, and the agglomerated fines or dust particles can then be easily removed from the gaseous stream by conventional dust separating means such as one or more cyclone separators or coarse filters and the like. The hard deposit may be removed continuously or intermittently.

In processes where the finely divided material in the gaseous stream contains particles of 10 microns and larger size, the gaseous stream is first passed through a dust separating means such as a very high pressure drop cyclone separator or through filters. A high pressure drop cyclone separator is one having a small diameter outlet pipe to provide a very small, high velocity gas vortex leaving the cyclone separator. The resulting separated gaseous stream then contains fine particles of a size less than 10 microns, or about 1 to 5 microns, and can be treated as set forth in the preceding paragraph to separate fines.

In another form of the present invention the catalyst fines in a fluid hydroforming process leaving the reactor cyclone separators in a vaporous hydroformate show up in the polymer bottoms from the scrubber. The fines or extremely finely divided particles can be removed and recovered from the liquid bottoms. The preferred method of accomplishing this is to use a falling film heat exchanger for the bottoms liquid and in this way the solid particles will be driven toward the heat exchange surface and be deposited on the tube walls. The heat exchanger comprises a plurality of tubes and the deposited solids are removed from the tube walls by rotary scraper means or the like.

In another form of the present invention large amounts or fine shale dust are removed from oil vapors obtained in distilling or retorting shale. This has been a problem in shale retorting. With the present invention the retorted shale oil vapors containing large loadings of dust are passed through a scraped surface heat exchanger in which the oil vapors are cooled but not to the condensation point and this causes deposition of the shale dust on the cool surfaces. The deposited shale particles agglomerate and form a hard deposit which is removed by the slowly rotating blade in the heat exchanger. Preferably the heat exchanger is inclined so that the scraped-off deposit falls down toward the hot vapor inlet. The removed hard deposit is sent to the burner where any retained oil is burned as fuel for the process; or the deposit may be separately recovered.

In the drawings:

Fig. 3 represents another form of apparatus adapted for the distillation of shale or the like.

Figure 1:
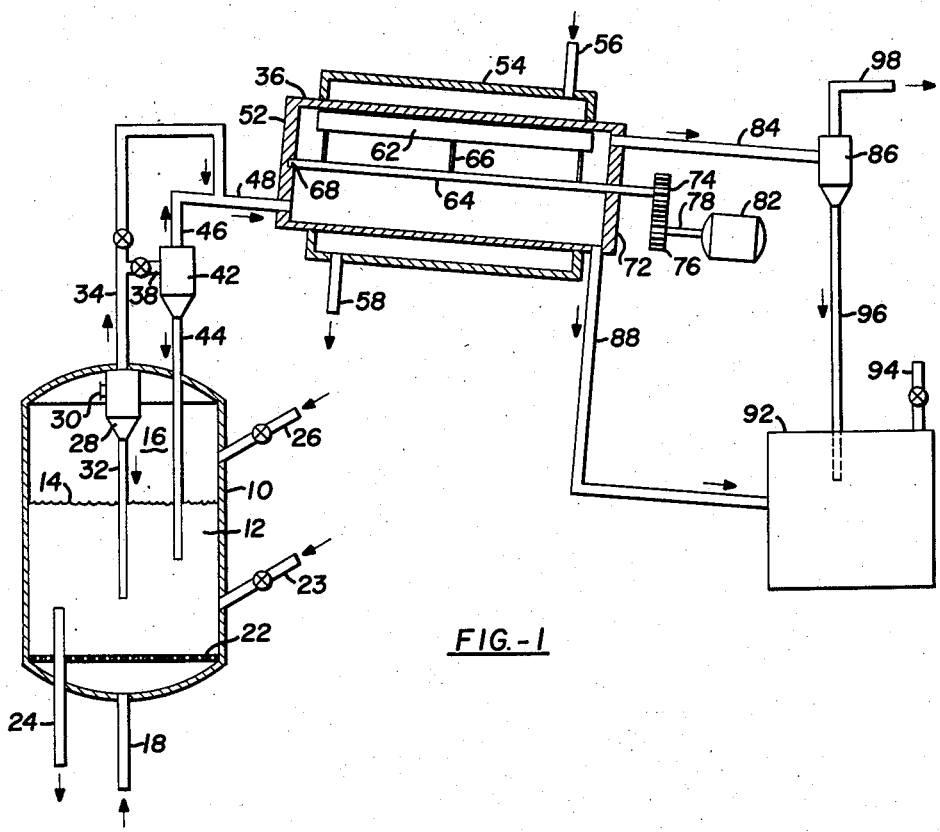
Fig. 1 represents one form of apparatus adapted to carry out the teachings of the present invention.

Referring now to Fig. 1 of the drawings, the reference character 10 designates a vessel adapted for carrying out reactions such as fluid hydroforming, fluid catalytic cracking, fluid coking, regeneration of fluid catalyst, etc. Vessel 10 contains a fluidized dense turbulent bed 12 of finely divided solids which may be catalytic or inert or a mixture of catalytic and inert particles. The average particle size of the finely divided solids in fluidized bed 12 is between about 5 and 150 microns with the majority of the particles between about 10 and 80 microns. In a fluid unit where the solids circulate from a reactor vessel to a regeneration vessel, fines of a size below about 10 microns are formed by attrition of the catlyst or solid particles.

The dense turbulent fluidized bed 12 has a level indicated at 14 with a dilute phase or suspension 16 thereabove. In the specific form shown in Fig. 1, the finely divided solids are introduced into vessel 10 through line 18 which enters the bottom of vessel 10 below distribution grid 22. The finely divided solids may be introduced into vessel 10 as a suspension in vapors or gas passing through line 18. The finely divided solids may be added directly to the fluid bed 12 in any manner instead of passing through a grid like 22 shown in Fig. 1. For example, the solids may be introduced directly into fluid bed 12 through line 23 above grid 22 and then line 18 is used for the introduction of a gaseous fluid. Catalyst or other solid particles are withdrawn from vessel 10 through line 24. Fresh make-up catalyst or other solid may be introduced through line 26 into reactor 10 but may be added at other places, if desired.

The vessel 10 may be the only vessel in the process unit or it may be one of a two-unit process as for example in fluid hydroforming where catalyst is maintained as a fluid bed in the reactor such as shown in Fig. 1 and then spent catalyst containing carbonaceous deposits is withdrawn and introduced into a regeneration vessel similar to the reactor shown in Fig. 1. Or other forms of regeneration vessels may be used. Catalyst from the regenerator or reactor is passed either through line 23 or through line 18 into the reactor vessel 10. Catalyst withdrawn from vessel 10 through line 24 goes to the other unit which may be the reactor or regeneration zone and the catalyst is circulated between the vessels as is well known in the art. A two-unit system for shale distillation is shown in Fig. 3 and a similar arrangement may be utilized in fluid cracking, hydroforming and coking. The apparatus shown in Fig. 1 can be used for hydroforming or regeneration of the catalyst but will be specifically described in connection with regeneration of a finely divided platinum hydroforming catalyst.

The catalyst to be regenerated is introduced into vessel 10 through line 18 or through line 23 and regenerated catalyst is withdrawn from the dense bed 12 through line 24 and passed to the reactor (not shown in Fig. 1). The catalyst particles have an average size between about 50 and 70 microns but smaller and larger particles are present in the catalyst mixture. The catalyst comprises 0.03 to 0.3% platinum on alumina. The temperature during regeneration is between about 900° and 1150° F. The air for regeneration may be introduced with the catalyst through line 18 or may be separately introduced into vessel 10. During regeneration, carbonaceous deposits are burned off the catalyst particles. The superficial velocity of the air flowing upwardly through the fluid bed 12 is between about 0.5 and 1.5 feet per second. The density of the fluidized bed 12 is between about 30 and 40 lbs. per cubic foot. The density of the dilute phase or suspension 16 is between about 0.1 and 2.0 lb. per cubic foot, depending on the gas velocity.

Regeneration gases passing up through the dilute phase 16 contain entrained solids and the gases are passed into cyclone separator 28 having inlet 30 where most of the larger entrained catalyst particles are separated and returned to the dense bed 12 through dip leg 32. The separated gases pass through outlet line 34 and if they contain only solid catalyst particles below about 5 microns, they are passed to the cooling tube 36 presently to be described in greater detail. If the exit gases passing from cyclone separator 28 contain particles larger than about 10 microns, the gases are passed through line 38 and another dust separating stage which is shown in the drawing as a cyclone separator 42 but which is preferably a very high pressure drop cyclone separator or a dust filter. The separated solids are returned through dip leg 44 to fluid bed 12 and the separated hot gases leave overhead through line 46 to cooling tube 36. The gases passing overhead contain only particles up to about 5 microns in size. In this process it is essential to remove coarser solids of a size of 10 microns and coarser, because if these coarser solid catalyst particles are present in any significant amount, they scour the deposit off the cooling tube as fast as it is formed.

The hot regeneration gases containing about 0.1 to 1.0 lb. per 1000 cubic feet of gas of 0–5 micron platinum-containing catalyst and at a temperature between about 850° and 1150° F. are introduced into the higher end of the stationary cooling tube 36. The cooling tube is shown as an elongated cylinder slightly inclined to have the right hand end of the tube 36 in Fig. 1 lower than the left hand end to permit passage of hard solids to the discharge end of the cooling tube 36. The line 48 leading from the cyclone separators 28 and 42 passes through the lower portion of end wall 52 of tube 36 for the introduction of hot regeneration gases into the cooling tube. A cooling jacket 54 surrounds the cooling tube 36 and is provided with an inlet 56 and outlet 58 for a cooling medium such as steam. When the hot regeneration gases containing the fines or dust strike the cool wall of the cooling tube 36, the fines or dust is deposited on the wall of tube 36 where the particles agglomerate and form a hard deposit.

In order to maintain the proper heat exchange, the deposited solids must be continuously or intermittently removed and this is done by the slowly rotating elongated straight scraper blade 62 secured to rod 64 by spiders or the like 66. There is only a small clearance between the scraper blade 62 and the wall of the tube 36 so as to keep the wall substantially clean of deposited solids and maintain heat exchange. The scraper blade 62 is shown as substantially the same length as the cooling jacket 54 but may be slightly longer than jacket 54.

Figure 1A:
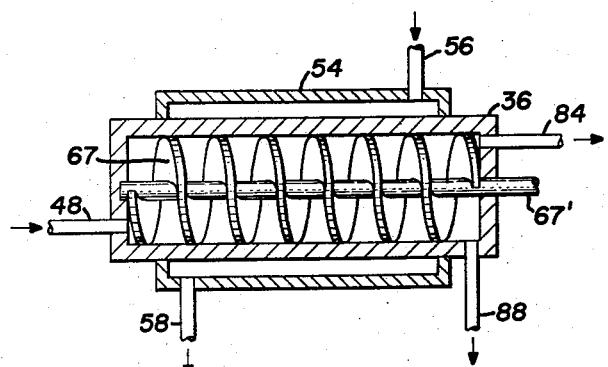
Fig. 1a represents a modified form of scraper for the cooling tube.

Instead of being slightly inclined as shown and described, the tube 36 may be horizontally arranged and the scraper blade would then be in the form of a screw or helix to force the solids in one direction toward the outlet. As shown diagrammatically in Fig. 1a the helix or screw 67 on shaft 67' may be substituted for the straight scraper blade 62. The helix or screw 67 fits closely to the wall of tube 36.

Rod 64 is arranged on the longitudinal axis of the cooling tube 36 and has its one end 68 mounted for rotation in the end wall 52 of cooling tube 36. The other end of rod 64 extends through the opposite end wall 72 of cooling tube 36 and is provided with a gear 74 meshing with a second gear 76. Gear 76 is actuated by driver 78 receiving power from motor 82. Some of the agglomerated catalyst removed by blade 62 is suspended in the regeneration gas passing through the cooling tube 36 and leaves the tube 36 through line 84 to a dust separating means such as a cyclone separator 86. The agglomerated particles are rather flat plates usually about ⅛ inch across and about .04" thick, though some may be much smaller and are easily and efficiently removed by a cyclone separator. There is about 95% recovery of the solids in the regenerations gas leaving the second cyclone separator 42 through line 46. The slowly moving blade 62 making about one revolution per 10 minutes also moves some of the scraped-off particles to the right of tube 36 in Fig. 1 and these fall into withdrawal line 88 leading to collection vessel or drum 92 having a gas release line 94. The agglomerated solids separated in cyclone separator 86 are passed to collection drum 92 through dip leg 96 and the separated gas goes overhead through line 98.

While a single cooling tube 36 has been shown in the drawing, it is to be understood that a plurality of such tubes may be used, each being provided with a scraper blade like 62. The hot regeneration gases pass through cooling tube 36 at a relatively low velocity between about 30 and 60 feet per second. In order to obtain efficient and substantially complete separation of solids or dust from the hot regeneration gas, it is necessary to have a high temperature difference between the regeneration gases and the cooling medium or the metal wall of the cooling tube 36. The logarithmic mean temperature difference between the gas or vapor inside the cooling tube 36 and the metal wall of the cooling tube 36 should be between about 250° and 500° F. The cooling tube or tubes 36 may be used as a waste heat boiler to recover heat from the regeneration gases and to produce steam for use in the plant.

The apparatus shown in Fig. 1 may also be used to remove noxious or dangerous dust particles such as activated uranium compounds, radioactive materials etc. from gaseous stream before passing them to the atmosphere. It may also be used to recover cracking catalyst from hot regeneration gases and shale dust from distilled shale. With respect to shale, this particular process will be more fully disclosed hereinafter in connection with Fig. 3.

In a specific example of the process illustrated in Fig. 1, hot regeneration gases at a temperature of about 1000° F. in line 48 and containing about 0.26 lb. of catalyst per 1000 cubic feet of gas are introduced into cooling tube 36. The catalyst consists of 0.3% platinum on alumina. About 29 pounds of catalyst per hour are carried over head in line 48 and the catalyst is of a size between about 0.2 and 7 microns. The temperature of the regeneration gases leaving cooling tube 36 through line 84 is about 600° F. The temperature of the metal surface of the cooling tube 36 is about 345° F. The velocity of the regeneration gases passing through the cooling tube 36 is about 40 feet per second. About 27.3 lbs. of catalyst per hour are recovered from cooling tube 36 through line 88. This gives a recovery of about 94%. The recovered catalyst passing through line 88 has particle sizes of 5 microns and less, but the particles are agglomerated into flakes about ⅛″ to ¼″ in size.

Figure 2:
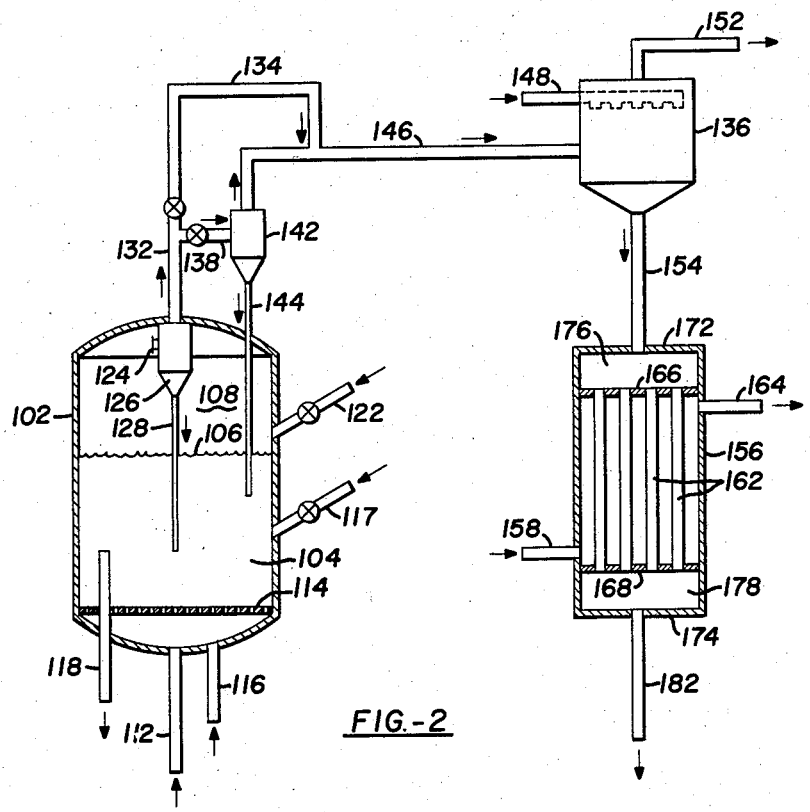
Fig. 2 represents another form of apparatus for separating finely divided solids or dust from liquids.

Referring now to Fig. 2 of the drawings, the reference character 102 designates a reaction vessel which can be used as a reactor, regenerator etc. as described in connection with vessel 10 in Fig. 1. The apparatus shown in Fig. 1 was specifically described in connection with the regeneration of catalyst from a hydroforming operation and the apparatus shown in Fig. 2 will be specifically described in connection with a fluid hydroforming process. Reactor 102 contains a dense fluidized turbulent bed 104 having a level indicated at 106 with a dilute phase or suspension 108 thereabove. Hot regenerated catalyst comprising 0.03 to 0.3% platinum on alumina of a particle size between about 20 and 100 microns with some particles being smaller and some larger than the range given and a small proportion of recycle gas or hydrogen-containing gas are introduced into reactor 102 through line 112 below distribution plate 114 in the lower portion of vessel 102. Preheated virgin naphtha or the like and a larger proportion of recycle gas are introduced into the lower portion of vessel 102 through line 116. If desired, the regenerated catalyst may be separately introduced into reactor 102 through line 117. The upflowing gaseous material in reactor 102 has a superficial velocity between about 0.5 and 1.0 ft./sec. to maintain the bed 104 in a dense turbulent condition having a density between about 30 and 40 lbs. per cu. ft. Catalyst to be regenerated is withdrawn from the dense bed 104 through line 118 and passed to a regeneration vessel (not shown) similar to vessel 102 in Fig. 2 and 10 in Fig. 1. An arrangement similar to that shown in Fig. 3 is used for a complete unit having a reactor and a regenerator with means for circulating the catalyst between the reactor and the regenerator. Fresh make-up catalyst may be added to reactor 102 through line 122.

The dilute phase 108 has a density between about 0.1 and 2 lb. per cu. ft. The temperature in reaction zone 102 may be between about 850° and 1000° F.

Reaction vapors pass from the dilute phase 108 through opening 124 in a dust separating means 126 such as a cyclone separator. The separated solids are returned to the dense bed 104 through the dip leg 128 and the separated vaporous reaction products pass overhead through 132. In cases where the reaction vapors contain only extremely fine solid particles up to about 10 microns in size the reaction vapors may be passed through line 134 to scrubber 136. However, if the reaction vapors contain particles larger than about 10 microns, the reaction vapors are passed through line 138 to a second dust separating means 142 such as a cyclone separator. The separated solids are returned to the dense bed 104 through line 144 and the separated vapors pass overhead through line 146 to the scrubber 136.

In a hydroforming process the hydroformed products contain polymers which are higher boiling than the desired gasoline fraction and the scrubber 136 is provided to condense out the heavy polymers. Sufficient scrubbing liquid such as heavy recycle gas oil is introduced through line 148 into the upper portion of the scrubber 136 to cool the vaporous reaction products from about 900° F. to a lower temperature between about 375° and 450° F. so that the higher boiling polymers are condensed and at the same time there is a scrubbing action removing the entrained dust particles. The vaporous reaction products or hydroformate vapors pass overhead through line 152 and are further processed in any conventional manner to recover desired motor fuel. The polymer liquid and scrubbing liquid, containing all of the catalyst fines is withdrawn from the bottom of the scrubber 136 through line 154 and passed downwardly through a falling film heat exchanger 156.

Cooling liquid such as fresh naphtha feed for the process is introduced into the heat exchanger 156 through line 158 to pass around a plurality of tubes 162. The heated fluid is withdrawn through line 164. As shown, the heat exchanger 156 is provided with tubes 162 and end tube sheets 166 and 168 through which the ends of tubes 162 pass and in which the tube ends are secured. The cooling liquid passes around the outside of tubes 162 in the section bounded by the end tube sheets 166 and 168. The tube sheets 166 and 168 are spaced from the ends 172 and 174 respectively to leave a space 176 at one end and a space 178 at the other end adjacent tube sheet 168. The space 176 permits feeding of the liquid polymer and scrubbing oil to the inside of tubes 162 and distributes the liquid to the tubes whereas the space 178 acts as a collecting zone for collecting the cooled liquid which is withdrawn through line 182.

In passing through the tubes 162, the difference in temperature between the hot liquid containing polymer which enters at a temperature of about 800° F. and leaves at about 250° F., and the temperature of the metal tubes 162 cooled by liquid or other cooling medium with the temperature of the tube being between about 200° and 600° F., causes the dust or finely divided particles in the liquid polymer to be driven toward the inner walls of the tubes 162 and there agglomerated into a relatively hard coating.

Figure 2A:
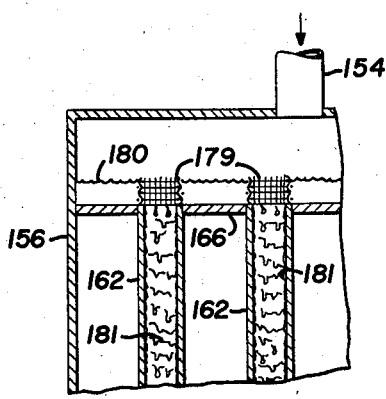
Fig. 2a represents an enlarged partial vertical cross-section of a falling film heat exchanger.

As shown in Fig. 2a the falling film heat exchanger has a screen or perforated wall 179 extending above each tube 162 to hold up a pool of liquid 180 which leaks through the screens and may also overflow the screens 179 and runs down through the tubes 162 as a film 181. The flow rate of the down-flowing polymer containing liquid is between about 50,000 and 75,000 lbs. per hour per square ft. of cross section. The polymer liquid is withdrawn through line 182 at a temperature between about 250° and 300° F. Most of the polymer liquid will be cooled further and recycled to the scrubber 136. A small amount, equivalent to the polymer produced by the process, is withdrawn from the process. It may be used as solvent, since it is highly aromatic. It will still contain a very small amount of solids (about 0.1%), and this must be removed, e.g. by filtration.

In a particular example where the catalyst fluidized bed 104 contains about 180 tons of platinum on alumina catalyst having a particle size between about 10 and 100 microns and there are carried overhead in the vaporous hydroformed reaction products passing through line 146 about 100 lbs. per million cubic feet of platinum-containing catalyst of a size between about 0.1 and 5 microns, about 225 pounds of catalyst are carried through line 146 per hour. About 26,000 gallons per hour of a scrubbing liquid as light heating oil is introduced through line 148 into the upper portion of the scrubbing zone 136 to cool the hydroformate vapors to about 430° F. and to condense polymers. The polymer amounts to about 200 gallons per hour. The total liquid at a temperature of about 800° F. is passed down through heat exchanger 156 where the cooling metal surface is maintained at about 200° F. The solids from the polymer liquid adhere to the metal surface tube walls 162 of the cooler 156. The liquid withdrawn through line 182 is at a temperature of about 250° F. As shown in the drawing in Figs. 2 and 2a the tubes 162 are cooled on the outside.

The solids adhering to the inner tube walls of falling film heat exchanger 156 are removed about once every 8 hours, by scrapers, or the like (not shown), such as are shown in Figs. 1 and 3.

The amount of the platinum-containing catalyst recovered in the heat exchanger 156 is about 210 lbs. per hour so that the recovery is about 93.5%.

Referring now to Fig. 3 where a shale retorting unit is shown, the reference character 200 designates a shale reactor or distillation zone containing a dense fluidized bed of shale particles 202 having a level indicated at 204 and superimposed by a dilute phase or suspension 206. Fresh shale is introduced into the reactor 200 through line 208 and preferably this line dips below the level 204 of the dense fluidized bed 202. The reactor 200 is provided with a distribution grid 212 arranged in the bottom portion of the reactor for distributing gas across the dense fluidized bed 202. The upflowing superficial velocity of the gaseous stream in the fluid bed 202 is between about 1.5 and 3.5 feet per second.

The size of the shale particles introduced into the reactor 200 is on the average of about a quarter of an inch but smaller or larger sizes may be used. Fresh shale disintegrates very rapidly in the reactor 200 to from 50 to 70% of 0–20 micron material and because of the large amount of fines within the fluid bed, the amount of fines going overhead with the oil vapor product is also increased. This has been one of the problems in oil shale distillation because the overhead oil vapors contain large amounts of exceedingly fine shale dust and heretofore it has been practically impossible to separate the solids from the oil vapors. The temperature during the distillation in the reactor 200 is between about 850° and 1100° F.

Spent shale particles are withdrawn directly from the dense fluidized bed 202 through standpipe 214 provided with a slide valve 216 for controlling the rate of withdrawal of the spent shale particles. These spent shale particles contain carbonaceous material and oil and they are mixed with air introduced through line 218 and passed through a transfer line 222 into the bottom portion of heater 224 provided with a bottom distribution grid 226. In the heater 224 the particles are heated by the burning of the carbonaceous material and the temperature in the heater is between about 1200° and 1400° F.

In the heater 224 the shale particles being burned are maintained as a dense turbulent fluidized bed 228 having a level indicated at 232 with a dilute phase 234 superimposed thereabove. The dense fluidized bed 202 in the reactor and the dense fluidized bed 228 in the heater have a density between about 20 and 40 lbs. per cubic ft. The superficial velocity of the gaseous material passing upwardly through the dense fluidized bed 228 is between about 2 and 4 feet per second.

The dilute phase 234 contains about 1 to 10 lbs. per cubic foot of shale dust and this is at least partially removed by passing the regeneration gases into inlet 236 of cyclone separator 238 or the like, and through the separator 238, the separated solid particles being returned to the dense fluidized bed 228 through dip leg 242. The separated gases pass overhead through line 244 and may be passed through a heat exchanger to recover heat, such as a waste heat boiler, or the combustion gases or flue gases may be passed directly to the atmosphere. In cases where there is an air pollution problem, the hot combustion gases can be passed through a scraping blade heat exchanger such as will be presently described in connection with the reactor side of the unit. If it is necessary to supply additional heat in the heater 224 to the shale particles, extraneous fuel such as lignites or bituminous coal or other cheap fuels may be added to the heater 224. Ash or waste solids can be periodically or intermittently withdrawn through line 245.

The heated shale particles at a temperature of about 200° to 400° F. higher than that in the reactor 200 are withdrawn directly from the dense fluidized bed 228 through standpipe 246 provided with a control slide valve 248 at its lower end. The heated solid shale particles are then picked up by a stream of steam introduced through line 252 to form a dilute suspension of the solids which are passed through line 254 into the bottom of the reactor 200 below the distribution grid 212.

Returning now to the reactor 200 hot distillation products in the dilute phase 206 contain about 0.5 to 5 lbs. of finely divided shale particles per cubic foot and these vapors are passed through opening 256 of a dust separating means such as cyclone separator 258. The separated solids are returned to the dense fluidized bed 202 through dip leg 262. The separated vapors pass overhead through line 264 and in cases where the reaction vapors or distilled vapors contain only particles below about 10 micron size the hot vapors may be passed through line 266 to a scraping blade heat exchanger 268.

In cases where the distilled oil vapors passing overhead through line 264 contain solids greater than about 10 microns in size, the vapors are passed through line 272 into a second solids separating device 274 such as a cyclone separator and the separated solids are returned to the dense fluidized bed 202 through line 276. The oil vapors then containing only solids of small particle size less than 10 microns pass overhead through line 278 to the heat exchanger 268. The heat exchanger is provided to separate substantially all of the finely divided solids from the oil vapors and to do this the oil vapors passing through the heat exchanger 268 must be maintained at a relatively low velocity between about 30 and 75 feet per second and also there must be a high temperature difference between the oil vapors passing through the heat exchanger and the cooling medium or the metal wall of the heat exchanger having the cooling agent on one side and the oil vapors on the inside. In passing through the heat exchanger 268 the oil vapors are cooled down from a temperature from about 1000° F. to a lower temperature of about 750° to 850° F. but this cooling is insufficient to condense any of the liquid so that the separation is in a dry state. If necessary, the oil vapor leaving the heat exchanger 268 can be reheated in suitable apparatus (not shown) to prevent condensation and then passed to a second scraping blade heat exchanger 268 if necessary or to separation equipment to recover distilled shale oil.

As shown in Fig. 3, the scraping blade heat exchanger 268 comprises an enlarged chamber 282 inclined upwardly toward the right in Fig. 3. It is preferred to have the heat exchanger inclined in this fashion in order to permit collection of the scraped off solids from the inner wall of the heat exchange chamber 282. Surrounding the heat exchange chamber or zone 282 is a jacket 284 having an inlet 286 and an outlet 288 for the cooling medium which is preferably water but which may be any other suitable coolant material.

Arranged within the heat exchange chamber 282 is a scraping blade 292 attached to rod 294 by spiders or the like 269. The rod or axle 294 is rotatably mounted in lower end wall 298 of the heat exchange chamber 282. At its other end the rod 294 extends through the other end wall 302 of the heat exchange chamber 282. Beyond the wall 302 the rod 294 is provided with a gear 304 which meshes with gear 306 adapted to be rotated by motor 308 through driving shaft 312.

The scraping blade is arranged to contact the inner wall of the heat exchange chamber 282 and is adapted to be slowly rotated by the motor 308 at about 5 to 10 r.p.m.

The upper end of the heat exchange chamber 282 is provided with an outlet 314 for removing the distilled oil vapors and for passing them to the desired apparatus for separation of shale oil. As pointed out above, if necessary, the oil vapor may be reheated to prevent condensation and may again be passed through another heat exchanger or may be passed through desired separation equipment.

The finely divided solids are deposited on the metal wall of the heat exchange chamber 282 and the rotating scraping blade 292 removes the deposited film. As the finely divided solids deposit on the wall of the heat exchange chamber 282, they agglomerate and form a hard deposit. This deposit or film is removed by the scraping blade 292. It will be noted that the length of the scraping blade 292 and the length of the cooling jacket 284 are about the same so that the deposits are formed in the area cleaned by the scraping blade 292.

The agglomerated solids removed from the inner wall of the heat exchange chamber 282 pass downwardly to the left in Fig. 3, down the inclined heat exchanger and are removed therefrom through line 316 and at least in part passed to the heater 224. Line 316 is provided with a valve 318 for controlling the flow of solids to the heater. Preferably the line 316 has its open end opening into the dense fluidized bed 288 below the level 232 therein. These solids contain some oil and by being sent to the heater or burner 24 the retained oil is burned as fuel for the process. By having the heat exchanger 268 inclined as shown the solids fall down the length of the inclined exchanger toward the hot vapor inlet from line 266 and in this way the countercurrent flow keeps the solids hot and prevents condensation of oil in the heat exchanger.

The form of the invention shown in Fig. 3 is adapted for use in small units. Where a larger plant is used, as for example, one having a shale oil production of about 10,000 barrels per day, about 23 heat exchange tubes having a diameter of about 4 inches and a length of about 40 feet will be required. Each of these tubes like heat exchange tube 268 will be provided with a scraper similar to that shown in tube 268. Instead of a straight scraper, a helical or screw shaped scraper may be used.

In a specific example for producing 10,000 barrels of oil from shale per day and where the distillation or reaction zone 200 is maintained at a temperature of about 1000° F. and the heater 224 is maintained at a temperature of about 1300° F. with both of the zones being a few pounds per square inch above atmospheric pressure the oil vapor passing through line 266 to the heat exchanger 268 contains about 60 lbs. per 1000 cubic feet of 0.1 to 5 micron shale particles. About 257,000 standard cubic feet of oil vapor per hour are passed through 23 heat exchangers like heat exchanger 268. The 23 heat exchangers are of the size above given for the large plant. The amount of finely divided solids of about 0.1 to 5 microns carried overhead through line 266 is about 27,000 lbs. per hour. The temperature of the shale vapors entering the cooling tubes 268 is about 985° F. and the temperature of the vapors leaving cooling tubes 268 through line 314 is about 890° F. The temperature of the cooling metal surface of cooling tubes 268 is about 675° F. The velocity of the shale oil vapors passing through the cooling tubes 268 is about 60 ft./sec. The amount of fine shale particles recovered by the scraping blades in heat exchangers 268 is about 19,000 lbs. per hour so that an efficiency of about 70% is realized.

While platinum on alumina has been specifically described in connection with the hydroforming process above described, it is to be understood that the invention is not to be restricted thereto as the invention has broader application and can be used with other hydroforming catalyst such as molybdenum oxide on alumina etc. and also with other catalysts such as cracking catalysts, as, for example, silica-alumina. The invention is also useful with other processes which produce hot gases or vapors containing solid particles of a size less than 5 to 10 microns. Such hot gases are passed through a cooling tube where the temperature differential between the hot gaseous material leaving the tube and the metal cooling surface must be at least about 50° F. and is preferably 200° F. or more. The velocity of the hot gaseous material passing through the cooling tube is below about 100 ft./sec. and preferably between about 20 and 60 ft./sec.

In general the temperature differential between the hot gaseous material leaving a heat exchanger and the cooled metal tube surface in Figs. 1 and 3 is preferably between about 100° F. and 400° F., and in connection with Fig. 2 where liquid materials are being treated, said temperature differential is about the same.

What is claimed is:

1. In a catalytic hydroforming process wherein hot hydroformate vapors contain entrained catalyst fines of a size below about 10 microns, the improvement which comprises cooling said hydroformate vapors to condense higher boiling polymers from gasoline or naphtha vapors and to scrub out entrained catalyst fines, then passing hot liquid polymer containing said catalyst fines at a relatively slow velocity through a heat exchange zone to cause deposition and agglomeration of fines on the wall of said heat exchange zone and to provide liquid polymer substantially free of fines and recovering the deposited fines.

2. A process according to claim 1 wherein said heat exchange zone comprises a falling film heat exchanger.

3. An apparatus of the character described including a vessel adapted to receive solids, means for passing a gaseous stream through said vessel for contacting solids therein, dust separating means associated with said vessel for removing entrained solids from the gaseous stream leaving said vessel, a heat exchanger provided with a jacket for a coolant, means connecting said dust separating means with said heat exchanger, said connecting means including a scrubbing vessel for condensing heavy ends from said gaseous stream and for scrubbing out fines below about 10 microns in size, said scrubbing vessel having a bottom withdrawal line for liquid for passage from said scrubbing vessel into said heat exchanger for separation of fines therefrom.

References Cited in the file of this patent

UNITED STATES PATENTS

| 1,298,602 | Thompson | Mar. 25, 1919 |
| 2,493,494 | Martin | Jan. 3, 1950 |
| 2,768,124 | Berg et al. | Oct. 23, 1956 |